ORTHODONTIC DEVICE

Filed May 8, 1961 6 Sheets-Sheet 1

INVENTOR.
CECIL C. STEINER
BY
Huebner & Worrel
ATTORNEYS.

ORTHODONTIC DEVICE

INVENTOR.
CECIL C. STEINER
BY
Huebner & Worrel
ATTORNEYS.

March 7, 1967 C. C. STEINER 3,307,261

ORTHODONTIC DEVICE

Filed May 8, 1961 6 Sheets-Sheet 3

INVENTOR.
CECIL C. STEINER
BY
Huebner & Worrel
ATTORNEYS.

ORTHODONTIC DEVICE

Filed May 8, 1961

6 Sheets-Sheet 4

INVENTOR.
CECIL C. STEINER
BY
Huebner & Worrel
ATTORNEYS.

ORTHODONTIC DEVICE

Filed May 8, 1961 6 Sheets-Sheet 5

INVENTOR.
CECIL C. STEINER
BY
Huebner & Worrel
ATTORNEYS.

March 7, 1967 C. C. STEINER 3,307,261

ORTHODONTIC DEVICE

Filed May 8, 1961 6 Sheets-Sheet 6

INVENTOR.
CECIL C. STEINER
BY
Huebner & Worrel
ATTORNEYS.

United States Patent Office 3,307,261

Patented Mar. 7, 1967

3,307,261

ORTHODONTIC DEVICE

Cecil C. Steiner, 153 S. Lasky Drive, Beverly Hills, Calif. 90212

Filed May 8, 1961, Ser. No. 112,153
2 Claims. (Cl. 32—14)

This invention relates to orthodontic devices and particularly to an improvement in such devices attached on the one hand to bands which clamp around teeth and on the other hand to an arch wire for correcting the position or inclination of mal-posed teeth or for stabilizing teeth, and is a continuation-in-part of my patent application Serial Number 751,488, now abandoned, entitled, "Orthodontic Device."

An object of the invention is to provide a device of the type described which embodies a relatively rigid bracket for seating an arch wire and to which bracket a spring rotation arm is affixed wherein force can be stored by deflection of the rotation arm, which results in energy or force being continuously applied during the period of treatment, that is to say while the device remains mounted in position relative to the arch wire with a terminal part or parts of the rotation arm pushing or pulling or both to move a tooth.

A further and more specific object of the invention is to provide in a device of this character structure which can be installed in a manner to create a push-pull action of the rotation arm on the teeth whereby one wing or section of the rotation arm exerts a resilient pushing action and an opposite section or wing exerts a complementary pulling action to steadily and more effectively than heretofore rotate or otherwise correct the position or inclination of teeth requiring adjustment.

A further and more specific object is to provide in a device of the character described spring arms as a unitary or integral part of the assembly to store force for rotating the teeth or to stabilize them in position.

An additional object is to provide in a device of the character described extension arms by which teeth can be either pulled or pushed toward or from the arch wire.

A further object is to provide in a device of this character a rotation arm comprising wings or extensions with suitable notches or other terminal means by which ligatures can be attached for the purpose of connection with the arch wire for rotating the teeth.

A further object is to embody in a device of this character a rotation arm that is tapered in such a way that ligatures will be guided toward the terminal portion of the rotation arm to their intended location so that they will activate the rotation arm to rotate or tip the teeth.

A still further object is to provide in one form of a device of this character a bracket and rotation arm unit wherein the rotation arm is secured to the bracket by projection welding, thus permitting the weld to be of minute character on the base of the bracket and the central section of the rotation arm and thus minimize interference with the action of the spring rotation arm, thereby increasing the effective length thereof.

Another object of this invention is to provide an orthodontic device of the general structure and characteristics mentioned and which embodies a relatively rigid bracket for seating an arch wire and to which bracket a rotation arm comprising a plural leaf spring is affixed, wherein force can be stored by deflection of the composite rotation arm, which results in energy or force being continuously applied during the period of treatment, that is to say while the device remains mounted in position relative to the arch wire with a terminal part or parts of the rotation arm pushing or pulling or both to move a tooth, and providing by the plural leaf spring assembly a medium for increasing flexibility without reaching a permanent set.

A further object of the invention is to provide a form thereof embodying two or more spring members in superimposed or laminated relationship, and wherein the leaves will have predetermined uniform thicknesses or predetermined differing thicknesses, as may be desirable to achieve the action desired.

A yet further object of this invention is to provide a device of this character, wherein the base of the bracket is enlarged with respect to the forward portion thereof and the rotation arm is secured to the base of the bracket by welding.

Heretofore brackets used in conjunction with arch wires have had physical characteristics which limited them in function primarily to that of a handle or link extending between arch wire and tooth. The present invention provides a storage reservoir of force in the bracket and arm assembly, affording the new and important function of supplementing the force provided by the arch wire with force provided by the bracket and arm assembly, and providing a relatively soft application of such force over an extended period.

These and other objects of the invention will be made further apparent from a consideration of the description which follows taken in conjunction with the drawings.

Figure 1:
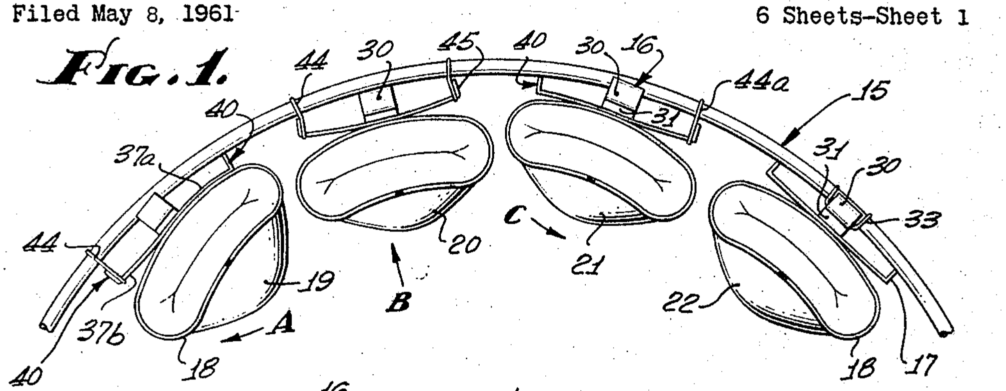
FIGURE 1 is a plan view illustrating generally a fragment of a human dental arch with an arch wire in position therearound and the orthodontic devices of my invention functionally associated with the arch wire and in turn with individual teeth by means of teeth bands.

The assembly illustrated in FIGURE 1 comprises an arch wire 15 of the well known conventional type and which may be either cylindrical, square or otherwise rectangular in cross section, a plurality of brackets 16 adapted to engage with the arch wire, a spring rotation arm 17 affixed to each bracket, and a band 18 of conventional type secured to each rotation arm for embracing a tooth as indicated at 19, 20, 21 or 22.

The arch wire may be mounted or anchored in any conventional manner at the posterior or anterior portion of the human arch (not illustrated) or may depend for anchorage on one or a combination of the tooth attachments illustrated in FIGURE 1.

The bracket 16 comprises a small block-like structure formed of relatively rigid metal or other suitable material having an external face or front portion 23 and an internal base or back portion 24. An open slot 25 is formed in the external portion 23 and of such cross sectional dimension as to enable the arch wire 15 to be seated therein. This slot 25 may be of circular cross section or of rectangular cross section as illustrated, the rectangular cross section being adaptable to receive either a rectangular or round arch wire.

The bracket 16 embodies a pair of oppositely extending ears 30 cooperating with sides 31 of the bracket to form notches or hook elements 32 for the engagement of a ligature such as a tie wire 33 for securing the arch wire and bracket together.

Figures 2, 3, 4:
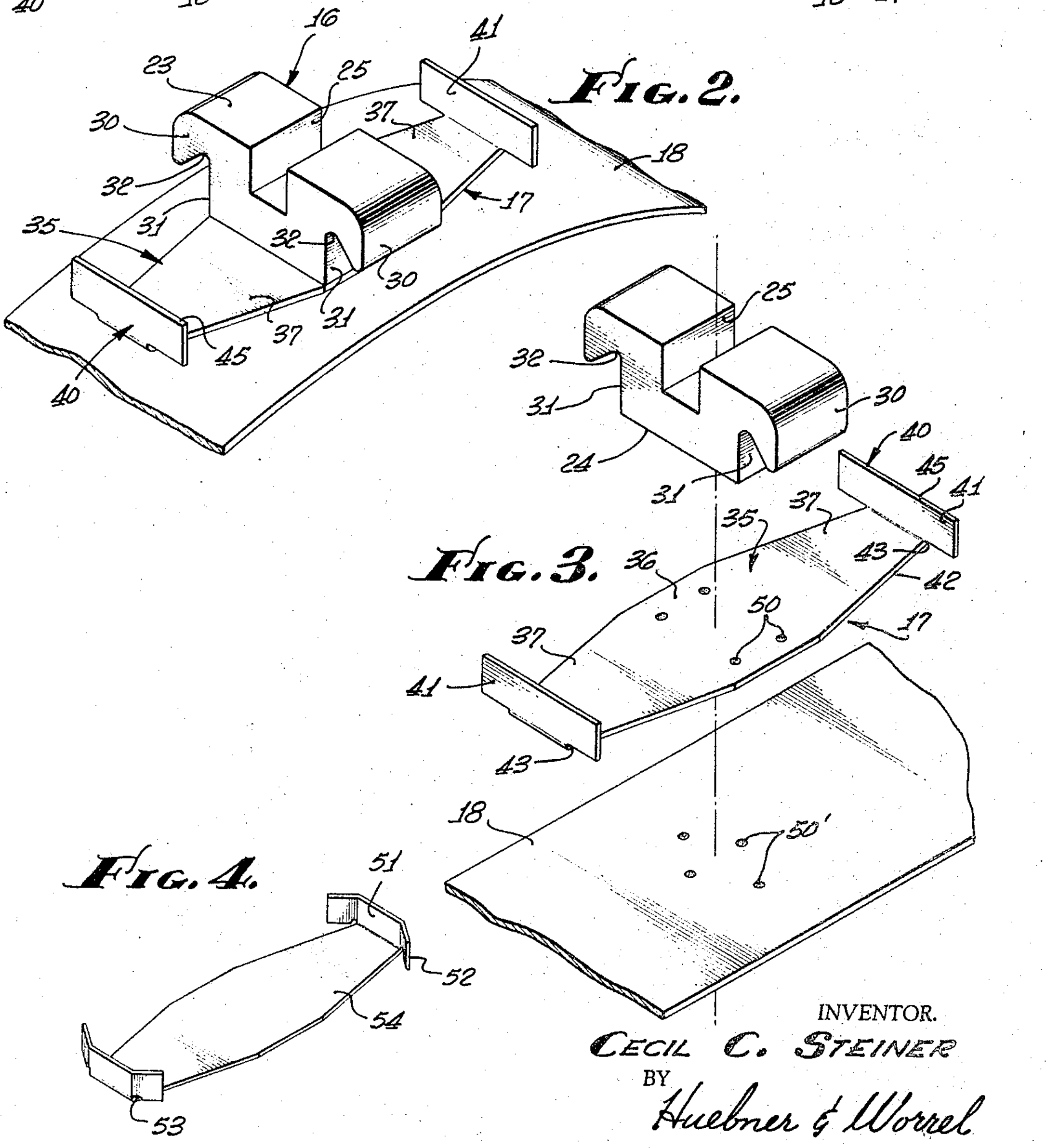
FIGURE 2 is an enlarged perspective of the bracket and rotation arm combination unit of the invention shown mounted on a fragment of a tooth engaging band.
FIGURE 3 is an exploded perspective view of the three elements illustrated as assembled in FIGURE 2.
FIGURE 4 is a perspective view of a different form of spring rotation arm.
Figure 5:
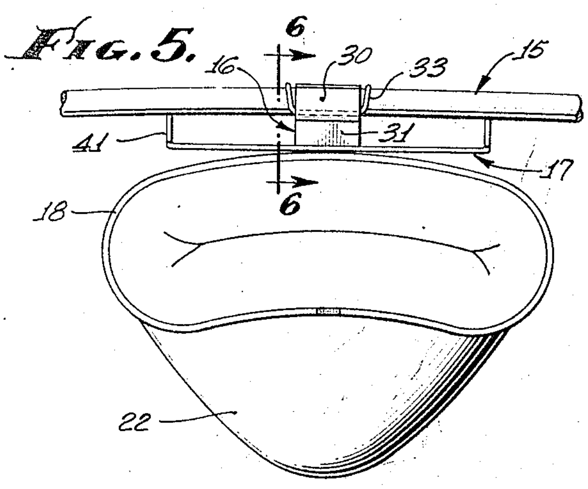
FIGURE 5 is an enlarged fragmentary view of the right hand portion of FIGURE 1, illustrating the orthodontic device applied to a properly positioned tooth, stabilizing the same.
Figure 6:
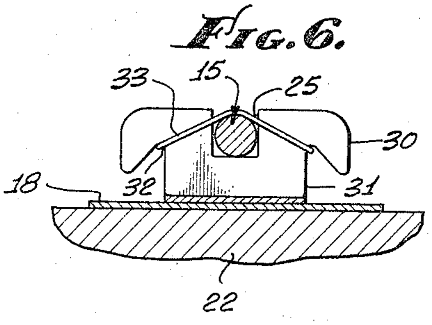
FIGURE 6 is a fragmentary cross section taken on the line 6—6 of FIGURE 5.
Figure 7:
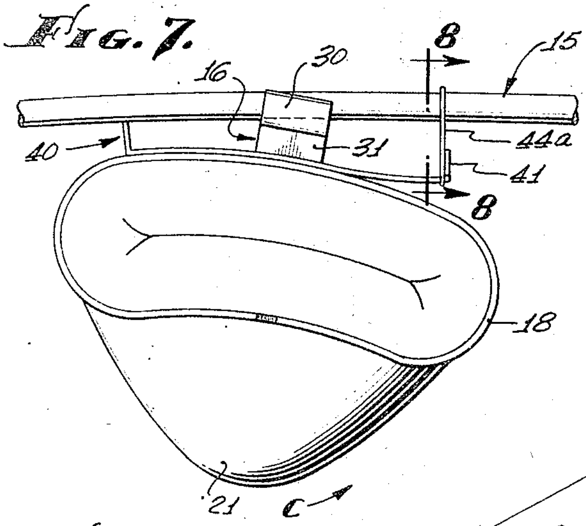
FIGURE 7 is a view generally similar to a portion of FIGURE 1 (the third tooth from the left) but with the spring rotation arm sustaining a different type of deflection than that illustrated in FIGURE 1.
Figure 8:
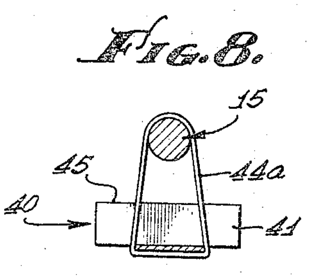
FIGURE 8 is a fragmentary sectional view taken on the line 8—8 of FIGURE 7.

Affixed to the bracket 24 is one of the rotation arms 17. As shown in FIGURES 1 through 3 of the drawing, this rotation arm comprises a generally flat leaf element 35 which is made of spring steel, precious metal, or other suitable spring material and comprises a central mounting section 36 having parallel edge sections as illustrated generally conforming in spacing and length to the sides 31 of the bracket and otherwise being generally complementary to the back 24 of the bracket. Wings 37 extend outwardly in both directions from the mounting section 36 and are preferably tapered as illustrated. The tapering assures a properly distributed bending action and also provides a guide to send ligatures into notches at the ends as hereinafter described. The tapering avoids a premature set or freeze of the arm which might otherwise occur by pressure exceeding the elastic limit of the metal. Each rotation arm terminates in a tab bearing element or plate 40 extending angularly to the plane of the wing and projecting transversely both ways from the end of the wing as illustrated at 41 providing in conjunction with the edges 42 of the wing, notches or hook elements 43 for the reception of ligatures or tie wires such as for example shown at 44. Edges 45 of the bearing element are adapted when desired to seat against the arch wire 15. These bearing elements 40 are sometimes referred to in the profession as "pillows."

For permanently attaching the rotation arm 17 to the bracket 16 I find it desirable to employ projection welding as indicated by the minute spaced apart weld dimples 50. This is a known technique which is useful in the present case in that it avoids a complete impairment of the spring action in the area of attachment between the rotation arm and the bracket and in fact results in much of the spring action being retained throughout the entire length of the rotation arm.

Projection welding such as referred to may be accomplished by forming the small dimples or protrusions 50 in the locations indicated, and when welding current is applied, fusing of the dimpled metal on the rotation arm with contiguous surface areas of the bracket occurs.

The same type of projection welding is preferably but not absolutely necessarily employed for attaching the tooth band 18 to the rotation arm. In this case welding dimples 50′ may be formed on the band. It is preferable but not essential to offset the pattern of the projection welding spots between those used for attachment of the rotation arm to the bracket and those for attachment of the tooth band to the rotation arm in the general manner illustrated in FIGURE 3.

The sequence of steps employed to assemble the bracket, rotation arm and tooth band may vary according to circumstances, including any particular problems encountered by the orthodontist. Assuming, however, for example, that the rotation arm has been welded to the bracket, the orthodontist may separately form a band around the tooth, remove it and then weld the band to the rotation arm. While I have heretofore referred to projection welding as the preferred means of attachment, certain metals or materials do not lend themselves satisfactorily to welding and of course it is within the general scope of the invention to braze or solder or otherwise attach the several parts together according to the demands of the metals or material employed. One example of a different type weld from projection would be a conventional weld along the side of the bracket. This is by way of example only, and not of limitation.

Assuming the band 18 to be snugly encompassing the tooth and of course being firmly attached to the assembled rotation arm and bracket, and the arch wire 15 to be located on the dental arch, the procedural use from this point will vary depending upon the particular treatment required of each individual tooth.

Taking for example tooth 19 in FIGURE 1, the correction indicated is a clockwise rotation in the direction of the arrow A. The tab bearing element 40 at one end of the rotation arm is seated against the inside surface of the arch wire 15, and the corresponding section or wing 37_a_ of the rotation arm is deflected as illustrated, so that the spring force stored in the wing by the initial deflection will push lingually, that is to say from the arch wire toward one side of the tooth. The opposite end portion or wing 37_b_ of the rotation arm is tied to the arch wire by the ligature 44. The wing 37_b_ is initially deflected in a direction toward the arch wire but the space between the end of the wing 37b and the arch wire 15 is such that even under the deflection required the bearing element 40 of the wing 37b is out of contact with the arch wire.

The two wings of the rotation arm, when the device is mounted as described in connection with tooth 19 exert continuous stored force in complementary direction, one force by pushing, the other by pulling and thus cooperatively urge rotation of the tooth 19 in the direction of the arrow A.

A very important feature of the invention is an elimination of a static condition, and substitution of a continuously active application of force supplementing the force of the arch wire and contributed by the spring action of the rotation arm. In this respect the wing 37a is in effect pushing upon the tooth and the wing 37b is in effect pulling upon the tooth until the spring rotation arm returns to its normal condition of repose which in the form illustrated would be substantially flat from end to end, as for example, shown in FIGURE 1, tooth 22 on the extreme right.

In the case of the tooth 20 the correction indicated is essentially a straight line shifting or movement of the tooth in the direction of the arrow B toward the arch wire. In such case the bracket is positioned so that the slot 25 is in axially generally parallel relationship to the arch wire 15, and ligatures 44 tie both terminal portions of the rotation arm to the arch wire so that the tab bearing portions 45 are in proximity to the arch wire. Thus the stored energy of the rotation arm seeking to resume its flat plane position of repose (passive) will pull the tooth 20 in a generally straight line in the direction of the arch wire and this movement will become automatically terminated either when the rotation arm has straightened out or the bottom of the slot 25 bears against the arch wire, all depending upon the relative setting of the parts.

Referring to the tooth 21, the movement desired is counter-clockwise, in the direction of the arrow C. Except for minor difference in the initial setting, the arrangement is merely the opposite of that for tooth 19.

Tooth 22 is being stabilized, or employed as an anchor, by having the bearing tabs of the wings seating against the arch wire, and the bracket 16 tied to the arch wire by the ligature 33. The rotation arm is in the passive position.

Various other adaptations will be obvious to one skilled in the art. For example, two wing terminal portions may be tied together to pull two teeth together. Or the setting may involve compression of both rotation arm bearing portions against the arch wire, for pushing the tooth straight back from the arch wire.

Once in operative position, the spring action of the rotation arm is self limiting, and when the tooth correction is attained, will then function as a stabilizer.

Various materials for the parts may be selected as suitable. Stainless steel is satisfactory for the bracket, a high spring nickel chrome for the rotation arm, and gold or other pliable metal for the band. Precious metal can be employed for the bracket, and the rotation arm, as well as for the band. These are by way of example only, and not of limitation. It is possible to form the bracket and rotation arm as one piece, although I prefer to form them separately and then unite them as described.

In FIGURE 4 is shown a rotation arm 50 wherein the end bearing tabs 51 have angular extensions 52, and notches 53 defined by cut-outs as shown.

Figures 9, 10:
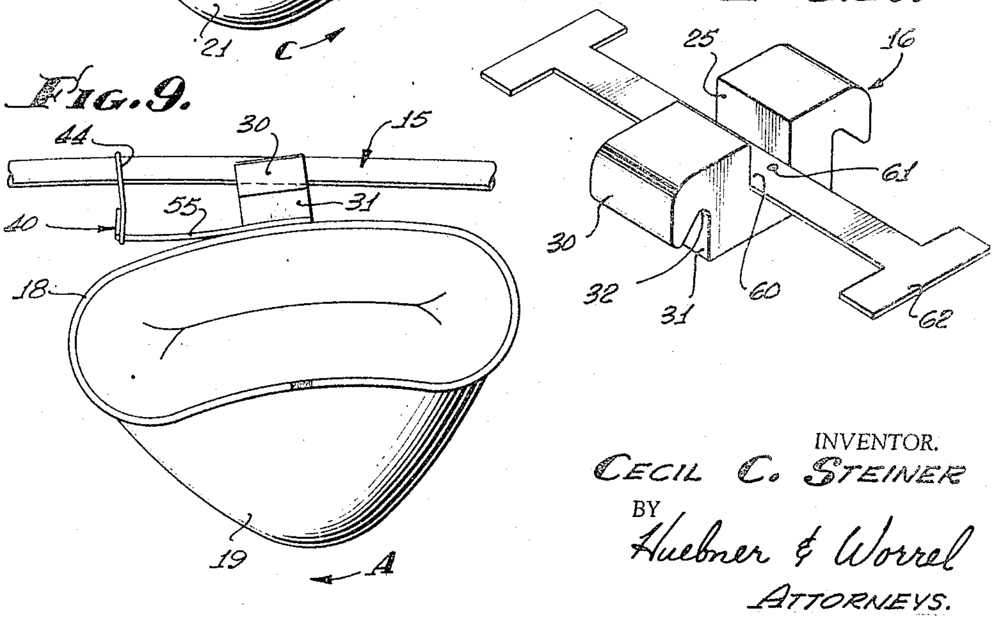
FIGURE 9 is a view generally similar to the left hand portion of FIGURE 1 (the first tooth thereof) but illustrating a rotation arm with a single wing, pulling.
FIGURE 10 is a perspective view of a bracket and rotation arm assembly of a form differing in details from the form of FIGURES 2 and 4.

In FIGURE 9 is shown a rotation arm 55 having a single wing. Such can be employed either for pushing or pulling, and may be preferred if space will not accommodate a second wing, or if the force required for moving the tooth is less than that provided by the double wing rotation arm. Single wing arms may be factory made, or obtained simply by breaking off one wing of the double wing type.

The double wing, or single wing, type may be altered in manufacture or when preparing for use, by deforming one or both wings from the normal passive plane illustrated. In the office or laboratory, this may be accomplished by bending the arm beyond the elastic limit of the spring material.

Figures 12, 13:
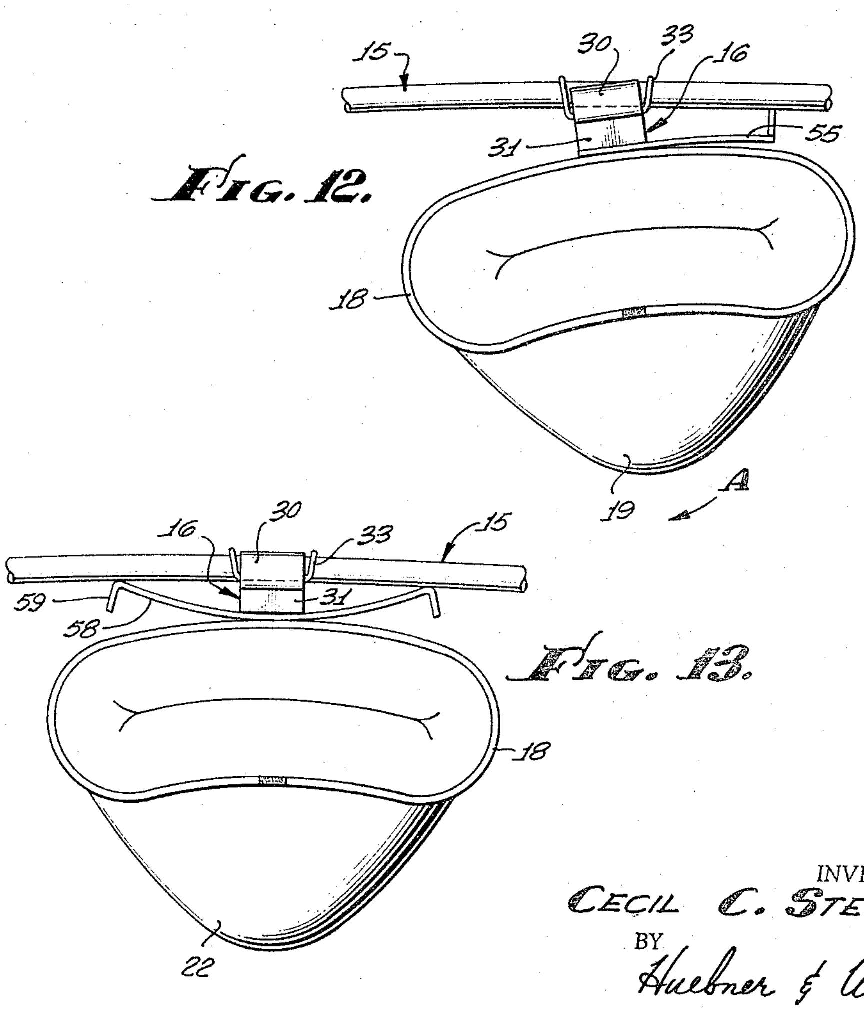
FIGURE 12 is a view somewhat like FIGURE 9, with a single wing on the reverse side, pushing, and with the bracket tied to the arch wire.
FIGURE 13 is a view patterned after FIGURE 5 but with the rotation arm differing in shape from that in the earlier figure. The tooth is correctly positioned, and the device is in passive, or stabilizing position.

Instead of being in the form of a flat leaf spring, the rotation arm may be a round or flat wire, with T ends, or beads, or hooks, and furthermore may be more or less continuously curved, as a bow 58, see FIGURE 13, instead of straight with angled bearing tabs. In the case of the bow, the ends of the bow may be utilized as the bearing portions, and they may be bent back as at 59 to provide notches for attachment of ligatures.

Figure 11:
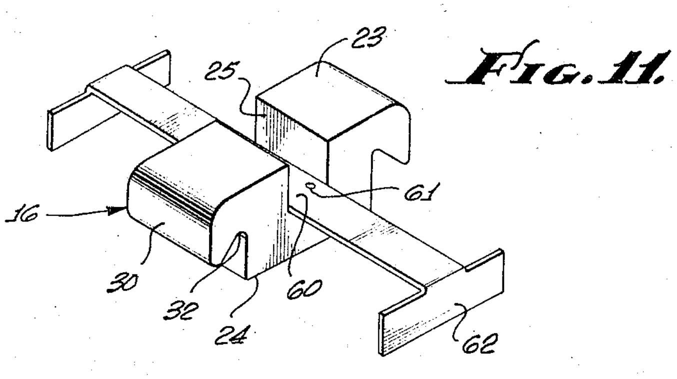
FIGURE 11 is a view generally similar to FIGURE 10, but with the tabs at the ends of the rotation arm bent downwardly.

The rotation arm may be made narrow enough (see FIGURES 10 and 11), so that its central mounting section 60 fits within the slot 25 and is welded as by projection welds 61 or other welding, soldering brazing, or other attaching method, to the bracket 16 at the bottom of the slot. Tabs 62 may lie in the plane of the wings (FIGURE 10), or be bent toward the back of the bracket (FIGURE 11).

Figure 14:
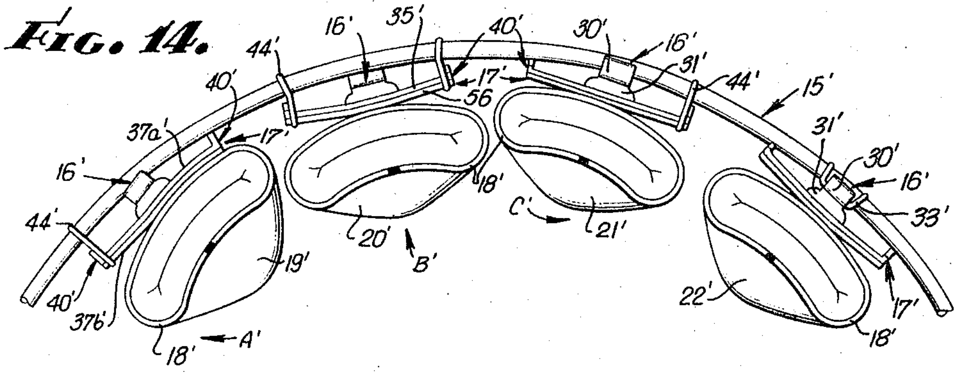
FIGURE 14 is a plan view similar to FIGURE 1 wherein the orthodontic device of my invention includes a plural leaf rotation arm.
Figures 15, 16, 17:
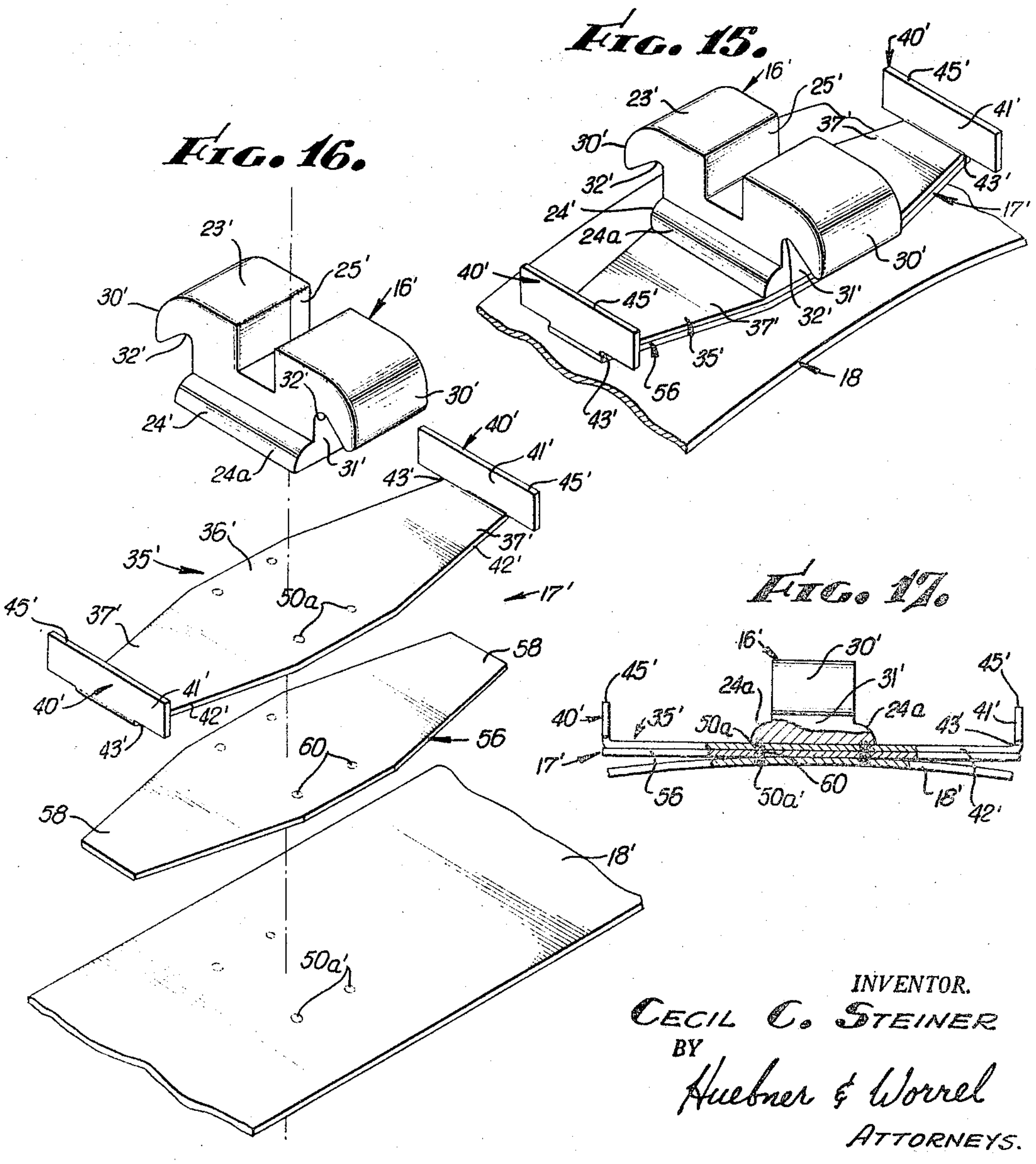
FIGURE 15 is a view similar to FIGURE 2 and illustrating the bracket and plural leaf rotation arm combination unit mounted on a fragment of a tooth engaging band.
FIGURE 16 is an exploded perspective view similar to FIGURE 3 and illustrating in spaced relationship the elements that are shown as assembled in FIGURE 15.
FIGURE 17 is a side elevational view of the assembled elements of FIGURE 15, certain portions being broken away to illustrate the welding of the leaves of the rotation arm and tooth engaging band to each other and to the bracket.
Figure 18:
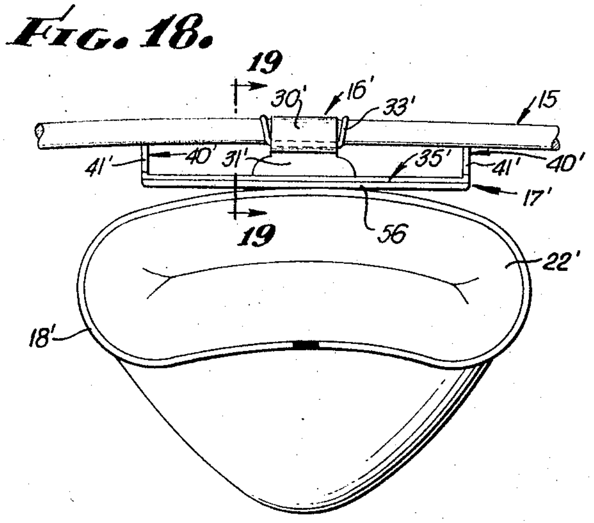
FIGURE 18 is a view similar to FIGURE 5, but illustrating the structure and application of the plural leaf rotation arm.
Figure 19:
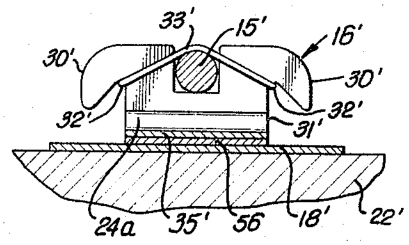
FIGURE 19 is a fragmentary, cross-sectional view taken on line 19—19 of FIGURE 18.

The assembly illustrated in FIG. 14 is similar to that shown in FIGURE 1 and comprises an arch wire 15′ of the well-known conventional type and which, as stated, may be either cylindrical, square or otherwise rectangular in cross-section, a plurality of brackets 16′ adapted to engage with the arch wire, and a plural leaf (laminated) spring rotation arm 17′ affixed to each bracket, and the band 18′ of conventional type secured to each rotation arm while embracing a tooth as indicated at 19′, 20′, 21′ or 22′.

The bracket 16′ is identical to the bracket 16 with the exception that the internal base or back portion 24′ is enlarged with respect to the front portion 23′. The enlargement of the base 24′ is composed of an elongated projection or shelf 24a located on each side of the base and being integral therewith and perpendicular to the slot 25′. This shelf is for the purpose of affixing the bracket to the wings and/or the wings and band.

Affixed to the bracket 16′ is a plural leaf rotation arm 17′. The generally flat leaf element 35′ is similar to the leaf element 35 illustrated in FIGS. 1 to 3. The leaf 35′ is welded to a leaf 56. The configuration of leaf 56 is identical to that of leaf 35′, with the exception that the wings 58 of leaf 56 do not include tab bearing elements or plates. However, leaf 56 does include weld dimples 60 that preferably are in alignment with weld dimples 50a on leaf 35′. The thickness dimensions of leaves 35′ and 56 of rotation arm 17′ may be identical or they may be different; their total thickness may equal or differ from the thickness of the single leaf rotation arm, depending upon factors involved in any given installation. Also, leaf 56 is shown as substantially coextensive in length with leaf 35′.

The same type of projection welding is preferably, but not necessarily, employed for attaching the tooth band 16′ to the rotation arm 17′ as was employed to attach the tooth band 16 to the rotation arm 17.

One example of a different type weld from the aforementioned projection welding would be a conventional line or spot weld along the projection shelf of the bracket, and through the leaves and band.

The correction applied to the tooth 19′ illustrated in FIGURE 14, by the orthodontic device applied thereto, is identical to the correction applied to tooth 19 illustrated in FIGURE 1. However, application of the orthodontic device illustrated in FIGURE 14 as applied to tooth 19′ may, under some conditions, more effectively accomplish the result than the single leaf rotation arm illustrated in FIGURE 1. It may be so composed that it delivers a softer action, with greater flexibility, as hereinafter more fully explained.

The orthodontic device applied to tooth 20′ will accomplish substantially the same result as the orthodontic device applied to tooth 20, but again the result will be achieved with the benefit of the laminated type spring rotation arm.

Referring to the tooth 21′, the tooth movement desired is counterclockwise in the direction of the arrow, and is accomplished in the same manner as described with reference to tooth 21 (FIGURE 1) except for the substitution of the plural leaf rotation arm.

The orthodontic device applied to tooth 22′ is utilized for the same purpose as that which was applied to tooth 22. The rotation arm 17′ is in the passive position.

It has been determined that plural superimposed leaf springs comprising the rotation arm of this invention display particularly important characteristics and properties. For instance, in a cantilever beam type flat spring, when thickness of the spring is reduced, maximum deflection without permanent set increases, although load capacity decreases. By constructing a plural leaf spring rotation arm of more than one piece of material, of individual reduced thickness, desired load capacity can be obtained, while maximum deflection without permanent set can be significantly increased.

By the judicious selection of a number of rotation arm leaves of proper thickness, similar or dissimilar, load capacity in the general magnitude of the capacities of the single thicker rotation arm may be obtained, while maximum deflection without set is greatly increased.

Figure 20:
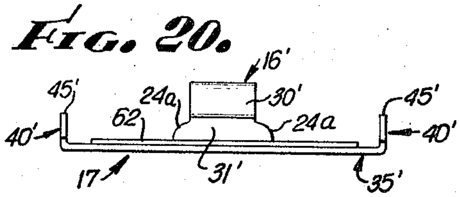
FIGURE 20 is a side elevational view illustrating one form of assembly of the rotation arm leaves.

Referring now to FIGURE 20 of the drawings, wherein a modified form of the invention is illustrated, a bracket 16′ is shown mounted on a rotation arm 17′. In this form the bracket is welded to a relatively short leaf 62 which overlies a relatively longer leaf 35′, and the latter is provided with the bearing tabs 40′.

Figure 21:
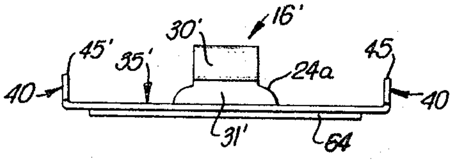
FIGURE 21 is also a side elevational view illustrating another form of assembly of the rotation arm leaves.

The invention illustrated in FIGURE 21 is similar to that form of the invention illustrated in FIGURES 14 to 17, inclusive, with the exception that the leaf 64 which is affixed to the outside of leaf 35′ is shorter in length than the latter.

Figure 22:
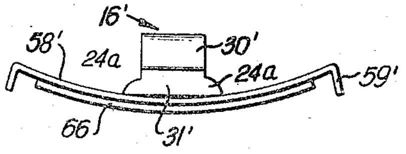
FIGURE 22 is another side elevational view somewhat like FIGURE 21 illustrating an additional form of the invention, which shows the plural leaf rotation arm differing in shape from that in the earlier figure and the extreme free ends of one leaf of the rotation arm having end plates turned down. This FIGURE 22 bears general similarity to FIGURE 13.

FIGURE 22 illustrates still another form of the invention which is somewhat similar to that form illustrated in FIGURE 21, but the bracket 16′ is affixed to a rotation arm leaf 58′, that has an initial arcuate configuration or continuous bow, and the ends of leaf 58′ have the bearing elements or pillows 59′ turned outwardly in a direction opposed to that illustrated in FIGURE 21. Also, rotation arm leaf 66 affixed to the leaf 58′, has a complementary arcuate configuration, and is shorter in length than leaf 58′.

Figure 23:
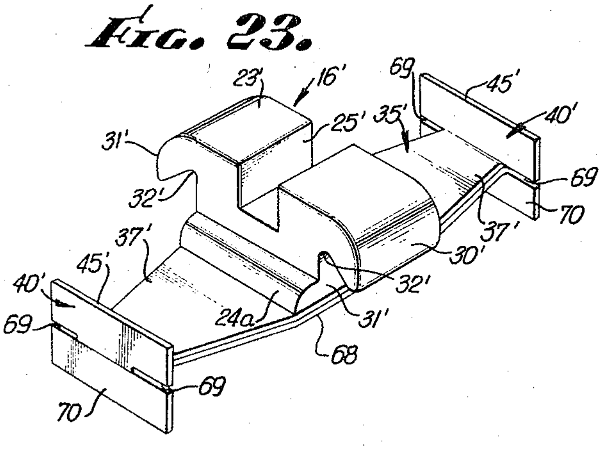
FIGURE 23 is an enlarged perspective view, illustrating and having embodied therein another form of the invention, with the end plates of the plural leaf rotation arm extending both ways.

The perspective view of another form of the invention, illustrated in FIGURE 23, shows a bracket 16′ mounted on a leaf 35′ of a rotation arm 17′ all identical to the bracket and rotation arm illustrated in FIGURES 14 to 18, inclusive. Affixed to the opposite side of leaf 35′ is another leaf 68 that is identical to leaf 35′. However, leaf 68 is inverted which results in the tab bearing elements or plates 70 extending in a direction opposed to the tab bearing elements 40′ of leaf 35′. This relationship of tab elements results in producing a notch 69 between each of the tab 40′ and 70. With end tabs 40′ and 70 on each end of each leaf 35′ and 68, respectively, it is possible to tie a ligature about either leaf or both leaves of the rotation arm and arch wire 15′.

Figures 24, 25, 26, 27:
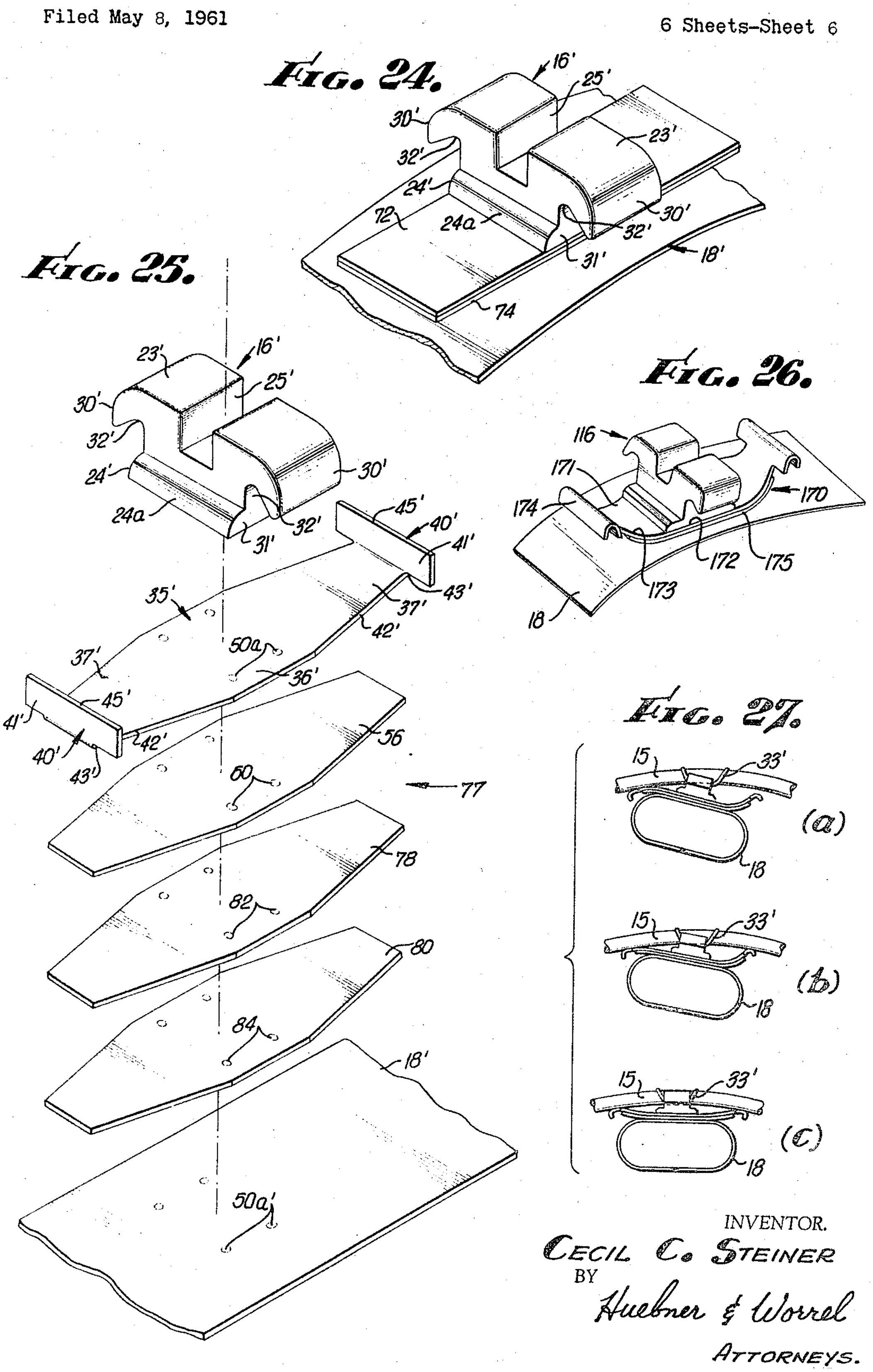
FIGURE 24 is a fragmentary perspective view, illustrating still another form of the invention, wherein the leaves of the rotation arm are of uniform width and do not have embodied therein any end plates or tabs.
FIGURE 25 is a perspective exploded view similar to FIGURES 3 and 16, but illustrating a rotation arm made up of four leaves.
FIGURE 26 is a perspective view of an additional form of bracket and plural leaf rotation arm combination.
FIGURE 27 is a series of side views of the device shown in FIGURE 26 tied to an arch wire and in progressive positions of rotation.

That form of the invention illustrated in FIGURE 24 shows a bracket 16′ and a pair of identical, rectangular leaves 72 and 74 that comprise a rotation arm.

Another form of rotation arm broadly designated 77 is illustrated in FIGURE 25. A bracket 16′, leaf 35′ with end tabs 40′ and leaf 56 is provided. This much duplicates in general structure the device shown in FIGURE 3. Additional leaves 78 and 80 are included. Leaves 78 and 80 are identical in outline to leaf 56 and may compare or vary in thickness as desired. It may be seen that leaf 35′ is projection welded to bracket 16′ and that leaves 56, 78 and 80, each of which have projection weld dimples 60, 82 and 84, respectively, are thereby welded to the leaf immediately above, and that tooth band 18′ is projection welded to leaf 80. The force that may be produced on a tooth by the orthodontic device illustrated in FIGURE 25 is accumulative, i.e., each leaf when deflected will produce a push or pull force on the tooth to cause the tooth to alter its position, and the tooth will be the recipient of the combined forces of the several leaves.

Although four leaves are illustrated as comprising the rotation arm illustrated in FIGURE 25, this is not to be considered a maximum limitation, as more can be utilized under proper circumstances.

The form of device illustrated in FIGURES 26 and 27 utilizes a bracket 116 having a configuration generally similar to that of the bracket 16′. The rotation arm 170 comprises a primary leaf 171 which initially has a plane flat central section 172 and end sections 173 which curve toward the bracket and terminate in rounded bearing elements 174. The rotation arm also includes a secondary leaf 175 shorter than the primary leaf but conforming in contour to the latter. The assembly of bracket and the plural leaves and attachment of the rotation arm to the band 18 is as previously described.

One use of the FIGURE 26 form is shown in FIGURE 27 wherein the bracket is tied by a ligature 33′ to an arch wire 15. The installation provides an initial push of the bearing element 174 at one end against the arch wire 15, as shown in (*a*), a partial rotation as shown in (*b*) wherein the bearing element at the opposite end of the rotation arm has made contact with the arch wire, and the final position in (*c*) wherein the desired rotation has been completed and the action thereafter is a stabilizing one.

Referring to any and all forms of the invention, the storage of force in the bracket and arm assembly is novel and functionally important. It results in a softer action over a longer period and requires fewer adjustments than by the old system where a bracket is merely a handle or link between the arch wire and tooth. Moreover, after the correction to the tooth has been accomplished, the present bracket and arm assembly stabilizes the tooth.

The wings of the rotation arms may vary as to length, and even in one device one wing may be relatively long and the other relatively short, all depending upon the conditions of the installation and the conditions of the teeth requiring correction.

While I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices.

What I claim as new and desire to secure by Letters Patent is:

1. An orthodontic device comprising a bracket and rotation arm unit including a forward portion and a rearward portion, the forward portion being adapted to have an arch wire seated therein, and the rearward portion being adapted to have secured thereto a tooth engaging band, said unit comprising a bracket formed of relatively hard non-yielding material, and a laminated plural leaf rotation arm affixed to the bracket, each leaf embodying flexible wings formed of spring material extending laterally from the bracket, the extreme free end portions of one of said wings of one leaf being adapted to bear upon the arch wire at a point spaced from the bracket sufficient for the wing to be flexed, whereby force may be stored in the wings of the leaves of the rotation arm by initial deformation of the same from their position of repose to bear upon the arch wire and the force be delivered over a period of time as the wings seek return to their position of repose.

2. An orthodontic device comprising a unit adapted at the back thereof to have secured thereto a tooth engaging band and at the front thereof to have an arch wire seated therein, said unit comprising a bracket, and a rotation arm comprising a plurality of leaves of resilient material extending laterally from the bracket, said plurality of leaves including a primary leaf formed with an end bearing element and a secondary leaf shorter than the primary leaf and conforming in contour to the primary leaf, said rotation arm having a central relatively flat section adjacent the bracket, and a curved end section which curves toward the bracket.

References Cited by the Examiner

UNITED STATES PATENTS

| | | | |
|---|---|---|---|
| 2,141,190 | 12/1938 | Linde | 32—14 |
| 2,381,128 | 8/1945 | Laskin | 32—14 |
| 2,854,747 | 10/1958 | Lewis | 32—14 |

RICHARD A. GAUDET, *Primary Examiner.*

J. W. HINEY, Jr., *Assistant Examiner.*